(12) United States Patent
Hall et al.

(10) Patent No.: US 11,327,490 B2
(45) Date of Patent: May 10, 2022

(54) DYNAMIC CONTROL AND CONFIGURATION OF AUTONOMOUS NAVIGATION SYSTEMS

(71) Applicant: VELODYNE LIDAR USA, INC., San Jose, CA (US)

(72) Inventors: David Hall, Oakland, CA (US); Anand Gopalan, Foster City, CA (US); Mathew Rekow, Santa Cruz, CA (US); Vishal Jain, Walnut Creek, CA (US)

(73) Assignee: VELODYNE LIDAR USA, INC., San Jose, CA (US)

( * ) Notice: Subject to any disclaimer, the term of this patent is extended or adjusted under 35 U.S.C. 154(b) by 214 days.

(21) Appl. No.: 16/241,825

(22) Filed: Jan. 7, 2019

(65) Prior Publication Data

US 2020/0218260 A1  Jul. 9, 2020

(51) Int. Cl.
*G01S 17/86* (2020.01)
*G01S 17/931* (2020.01)
*G05D 1/00* (2006.01)
*G05D 1/02* (2020.01)

(52) U.S. Cl.
CPC .......... *G05D 1/0088* (2013.01); *G01S 17/86* (2020.01); *G01S 17/931* (2020.01); *G05D 1/024* (2013.01); *G05D 2201/0213* (2013.01)

(58) Field of Classification Search
CPC ...... G01C 21/16; G05D 1/0088; G05D 1/024; G05D 2201/0213; G01S 17/931; G01S 17/86; G01S 7/497; G01S 2013/9322; G01S 13/93

USPC .......................................................... 701/23
See application file for complete search history.

(56) References Cited

U.S. PATENT DOCUMENTS

| | | | |
|---|---|---|---|
| 4,327,437 A * | 4/1982 | Frosch | G11B 3/08516 244/194 |
| 2006/0027404 A1 | 2/2006 | Foxlin | |
| 2008/0009965 A1 | 1/2008 | Bruemmer et al. | |
| 2008/0136626 A1* | 6/2008 | Hudson | G01S 17/86 340/540 |
| 2012/0173185 A1* | 7/2012 | Taylor | G01S 7/4004 702/104 |
| 2017/0328992 A1 | 11/2017 | Balk et al. | |
| 2019/0258251 A1* | 8/2019 | Ditty | G06K 9/00805 |

OTHER PUBLICATIONS

International Search Report and Written Opinion of PCT/US2020/012631 dated May 7, 2020, 13 pages.

* cited by examiner

*Primary Examiner* — Abby Y Lin
*Assistant Examiner* — Hossam M Abd El Latif
(74) *Attorney, Agent, or Firm* — Goodwin Procter LLP

(57) ABSTRACT

The present disclosure relates generally to systems and methods for generating, processing and correlating data from multiple sensors in an autonomous navigation system, and more particularly to the utilization of configurable and dynamic sensor modules within light detection and ranging systems that enable an improved correlation between sensor data as well as configurability and responsiveness of the system to its surrounding environment.

20 Claims, 15 Drawing Sheets

*For LiDAR, the emitted light source 110 is a laser*

Single emitter/detector pair oscillating mirror LIDAR design.

360

At Autonomous Driving System 340

( Start )    ( B )

Receive at MCU (Driver) sensor configuration parameters and receive at MCU (calibration engine) calibration parameters from ADSCU 362

Send from MCU (Driver) configuration parameters to activate sensor modules 364

Acquire data from an object source by the selected sensor modules 366

Multiplex the sensor data to generate a unified data packet 368

Send the unified data packet via a serial bus to MCU 370

In the MCU, de-multiplex unified data packet into homogeneous sensor data 372

In the MCU, send the homogeneous sensor data to a calibration engine 374

( A )

ADSCU = Autonomous Driving System Control Unit
MCU = microcontroller

At Autonomous Driving
System 340

( A )

↓

In the MCU, generate transform information in the calibration engine and send transform information to de-multiplexer
376

↓

In the MCU, integrate, by the de-multiplexer, the homogeneous sensor data and the transform data, and send to data processing
378

↓

Generate by data processing of the MCU, a point cloud comprising the homogeneous sensor data and the transform data, and send to ADSCU
380

↓

In the ADSCU, determine/adjust control of the vehicle based on the point cloud and generate updated sensor configurations and calibration parameters
382

↓

( B )

ADSCU = Autonomous Driving System Control Unit
MCU = microcontroller

Sensor Architectures

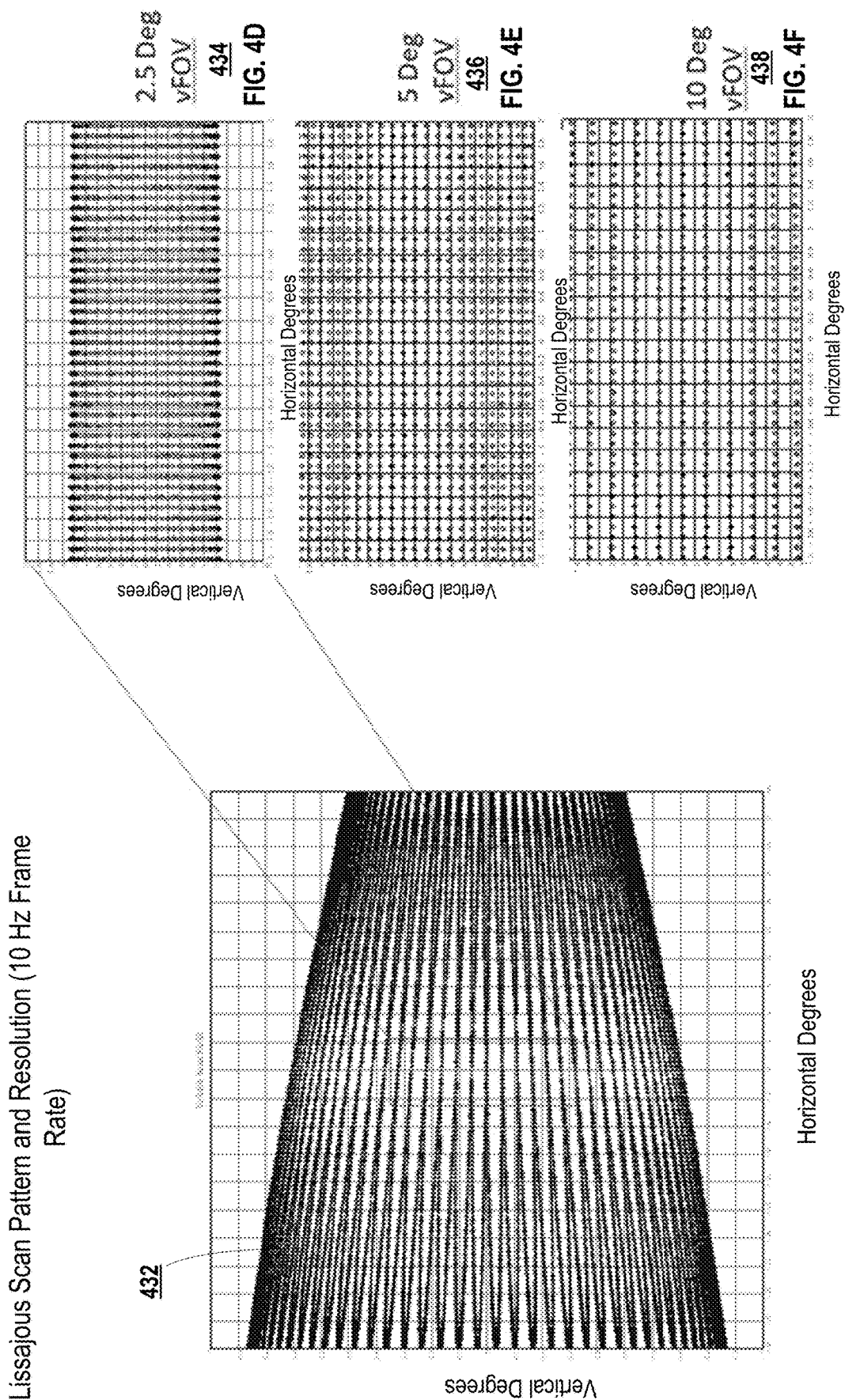

Scanning Pattern for Sensor Module

DYNAMIC CONTROL AND CONFIGURATION OF AUTONOMOUS NAVIGATION SYSTEMS

BACKGROUND

A. Technical Field

The present disclosure relates generally to systems and methods for generating, processing and correlating data from multiple sensors in an autonomous navigation system, and more particularly to the utilization of configurable and dynamic sensor modules within light detection and ranging (hereinafter, "LIDAR") systems that enable an improved correlation between sensor data as well as configurability and responsiveness of the system to its surrounding environment.

B. Background

One skilled in the art will understand the importance in the accuracy and timely analysis of sensor data within autonomous navigation systems. Autonomous navigation requires that a computerized system receive data from sensors, form a sufficiently accurate representation of its environment, and make decisions based on that data in real time. Any error in the interpretation of the sensor data or delays in timely initiating a responsive action to this sensor data can have undesired consequences. Modern autonomous systems must process data from multiple discrete sensor systems and interpret their combined outputs. The quantity of data from these various sensors can be immense and simply processing and correlating the outputs from different sensors may require a significant amount of processing power and time.

Implementations of a LiDAR or mixed-sensor system may have different operational requirements such as field-of-view, range, response rate, etc. Adapting these systems to different types of autonomous navigation systems and vehicles may be challenging as the environment and intended use of the system can present varying performance requirements. Simply positioning and integrating sensors within different types of vehicles may present problems for many of the prior-art, sensor-based navigation systems. For example, sensors cannot be easily collocated because the data is subject to parallax error caused by data taken from different vantage points. In addition, these sensors may also have different rates of data collection. Improper correlation of this sensor data may result in motion errors or conflicts across the sensor data. Accordingly, the autonomous system must first process and interpret data from relevant sensors followed by correlating them with one another before any autonomous navigation decisions can be made. Any unnecessary delay within the decision-making process may result in a failure of the autonomous driving system.

Accordingly, what is needed are systems and methods that provide configurable, accurate, timely and efficient solutions for the reception and processing of sensor data across a plurality of sensors installed within an autonomous navigation system.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIGS. 3D and 3E illustrate methods for dynamically configuring different sensors and sensor types within an autonomous navigation system according to embodiments of the current disclosure.

FIG. 4C illustrates a lissajous scan pattern and resolution according to embodiments of the present disclosure. FIG. 4D, FIG. 4E, and FIG. 4F illustrate scan resolutions for a field of view (FOV) according to embodiments of the present disclosure.

DETAILED DESCRIPTION OF EMBODIMENTS

Figure 1:
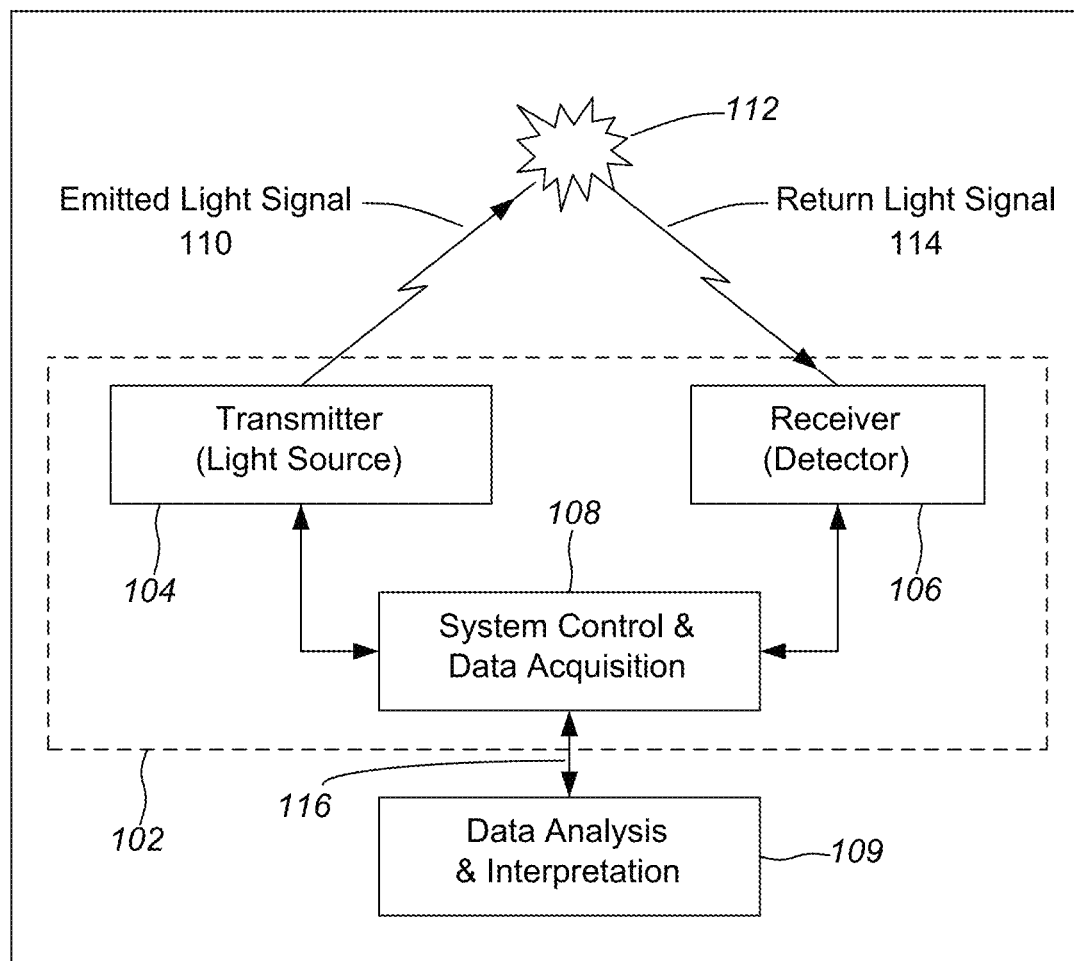
FIG. 1 depicts the operation of a LiDAR system according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists that follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A light detection and ranging system, such as a LIDAR system, may be a tool to measure the shape and contour of the environment surrounding the system. LIDAR systems may be applied to numerous applications including both autonomous navigation and aerial mapping of a surface. LIDAR systems emit a light pulse that is subsequently reflected off an object within the environment in which a system operates. The time each pulse travels from being emitted to being received may be measured (i.e., time-of-flight "TOF") to determine the distance between the object and the LIDAR system. The science is based on the physics of light and optics.

In a LIDAR system, light may be emitted from a rapidly firing laser. Laser light travels through a medium and reflects off points of surfaces in the environment such as buildings, tree branches and vehicles. The reflected light energy returns to a LIDAR transceiver (detector) where it is recorded and used to map the environment.

FIG. 1 depicts the operation of LiDAR components 102 and data analysis & interpretation 109 according to embodiments of the present disclosure. LiDAR components 102 may comprise a transmitter 104 that transmits emitted light signal 110, receiver 106 comprising a detector, and system control and data acquisition 108. LiDAR components 102 may be referred to as a LIDAR transceiver. Emitted light signal 110 propagates through a medium and reflects off object 112. Return light signal 114 propagates through the medium and is received by receiver 106. System control and data acquisition 108 may control the light emission by transmitter 104 and the data acquisition may record the return light signal 114 detected by receiver 106. Data analysis & interpretation 109 may receive an output via connection 116 from system control and data acquisition 108 and perform data analysis functions. Connection 116 may be implemented with a wireless or non-contact communication method. Transmitter 104 and receiver 106 may include optical lens and mirrors (not shown). Transmitter 104 may emit a laser beam having a plurality of pulses in a particular sequence. In some embodiments, light detection and ranging components 102 and data analysis & interpretation 109 comprise a LIDAR system. A design element of receiver 106 is a horizontal field of view (hereinafter, "FOV") and a vertical FOV. One skilled in the art will recognize that the FOV effectively defines the visibility area relating to the specific LiDAR system. The horizontal and vertical FOVs may be defined by a single LiDAR sensor or may relate to a plurality of configurable sensors (which may be exclusively LiDAR sensors or may comprise different types of sensors). The FOV may be considered a scanning area for a LIDAR system. A scanning mirror may be utilized to obtain a scanned FOV.

Figure 2A:
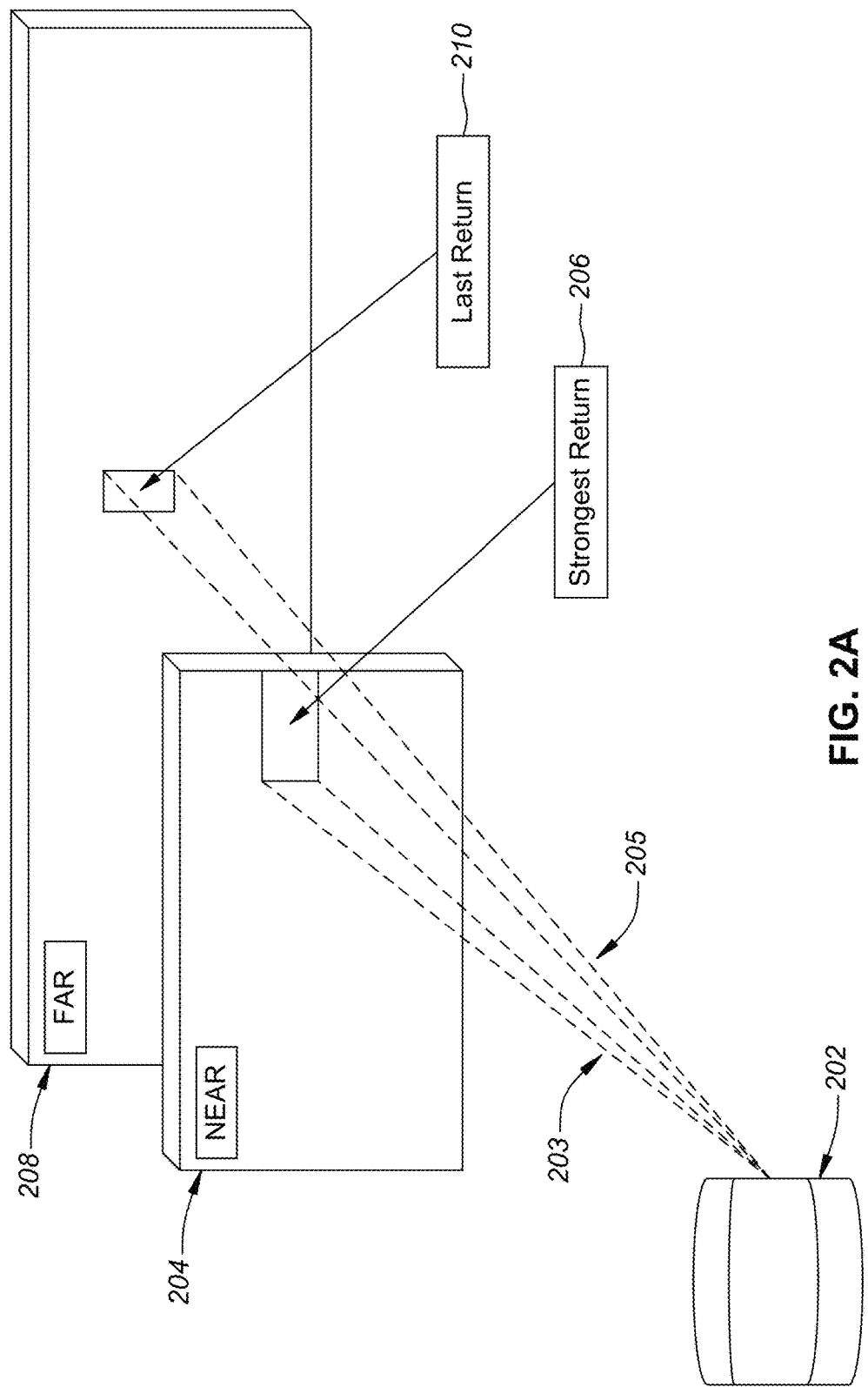
FIG. 2A illustrates the operation of a LiDAR system and multiple return light signals according to embodiments of the present document.

FIG. 2A illustrates the operation 200 of LiDAR system 202 including multiple return light signals: (1) return signal 203 and (2) return signal 205 according to embodiments of the present document. Due to the laser's beam divergence, a single laser firing often hits multiple objects producing multiple returns. The light detection and ranging system 202 may analyze multiple returns and may report either the strongest return, the last return, or both returns. Per FIG. 2A, light detection and ranging system 202 emits a laser in the direction of near wall 204 and far wall 208. As illustrated, the majority of the beam hits the near wall 204 at area 206 resulting in return signal 203, and another portion of the beam hits the far wall 208 at area 210 resulting in return signal 205. Return signal 203 may have a shorter TOF and a stronger received signal strength compared with return signal 205. In both single and multiple return LIDAR systems, it is important that the return signal is accurately associated with the transmitted light signal so that an accurate TOF is calculated.

Some embodiments of a LIDAR system may capture distance data in a 2-D (i.e. single plane) point cloud manner. These LIDAR systems may be often used in industrial applications and may be often repurposed for surveying, mapping, autonomous navigation, and other uses. Some embodiments of these devices rely on the use of a single laser emitter/detector pair combined with some type of moving mirror to effect scanning across at least one plane. This mirror not only reflects the emitted light from the diode but may also reflect the return light to the detector. Use of an oscillating mirror in this application may be a means to achieving 90-180-360 degrees of azimuth (horizontal) view while simplifying both the system design and manufacturability. Many applications require more data than just a single 2-D plane. The 2-D point cloud may be expanded to form a 3-D point cloud, where multiple 2-D clouds are used, each pointing at a different elevation (vertical) angle. Design elements of the receiver of light detection and ranging system 202 include the horizontal FOV and the vertical FOV.

Figure 2B:
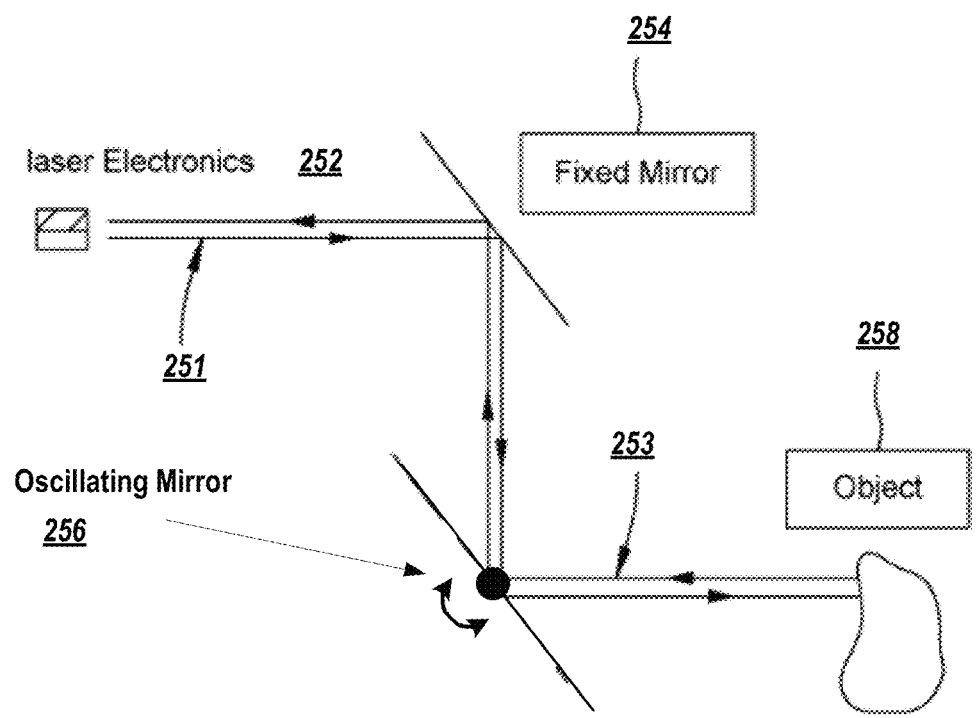
FIG. 2B depicts a LIDAR system with an oscillating mirror according to embodiments of the present document.

FIG. 2B depicts a LIDAR system 250 with an oscillating mirror according to embodiments of the present document. LIDAR system 250 employs a single laser emitter/detector combined with an oscillating mirror to effectively scan across a plane. Distance measurements performed by such a system are effectively two-dimensional (i.e., planar), and the captured distance points are rendered as a 2-D (i.e., single plane) point cloud. In some embodiments, but without limitations, oscillating mirrors are oscillated at very fast speeds (e.g., thousands of cycles per minute).

LIDAR system 250 comprises laser electronics 252, which comprises a single light emitter and light detector. The emitted laser signal 251 may be directed to a fixed mirror 254, which reflects the emitted laser signal 251 to oscillating mirror 256. As oscillating mirror 256 "oscillates", the emitted laser signal 251 may reflect off object 258 in its propagation path. The reflected signal 253 may be coupled to the detector in laser electronics 252 via the oscillating mirror 256 and fixed mirror 254. Design elements of the receiver of LIDAR system 250 include the horizontal FOV and the vertical FOV, which defines a scanning area.

Figure 3A:
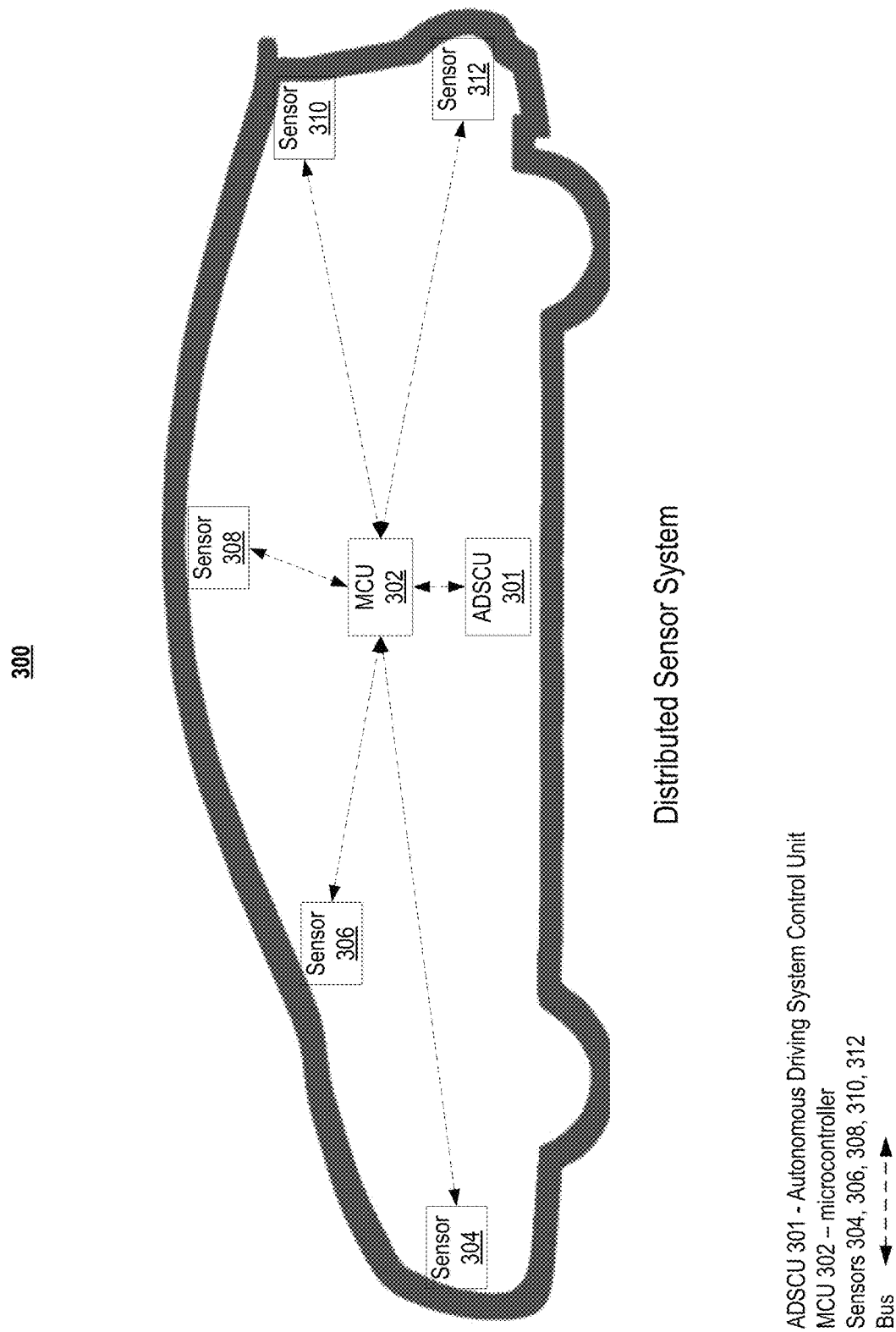
FIG. 3A depicts a distributed sensor system installed in an automobile utilizing a suite of sensors coupled to a microcontroller (hereinafter, "MCU") according to embodiments of the present document.

FIG. 3A depicts a distributed sensor system 300 installed in an automobile utilizing a suite of sensors coupled to an MCU 302 according to embodiments of the present disclosure. The suite of sensors includes sensor module 304, sensor module 306, sensor module 308, sensor module 310 and sensor module 312. The term "sensor module" is intended to be broadly defined and includes implementations of single sensor modules and multi-sensor modules. In addition, the types of sensor(s) within a sensor module may vary depending on the configuration of the system. In certain instances, a sensor module may comprise a single sensor (hereinafter, "single sensor module") such as a LiDAR sensor or multiple sensors (hereinafter, "multi-sensor module"). A multi-sensor module may comprise a plurality of integrated sensors, a plurality of discrete sensors or a combination thereof. The multi-sensor module may also comprise a plurality of LiDAR sensors or a plurality of different types of sensors that are correlated within the module. As shown in FIG. 3A, the suite of sensor modules may be distributed in a variety of location on the vehicle. Correlated sensor data from the various sensor modules are provided to the MCU 302 for analysis and decision processing. The connectivity between the sensor modules and the MCU 302 is provided by a sensor bus that may transmit the different sensor data in a serial manner (there may be other embodiments in which sensor data is transmitted on a parallel bus).

As previously described, a sensor module may comprise a single sensor or multiple sensors and support various types of sensors such as a LIDAR transceiver, thermal/far IR sensor, visible/near IR sensor or other types of sensor known to one of skill in the art. The sensor structure may have various shapes including a modular design that is rectangular or a wedge shaped that may be tiled together and/or stacked and may allow for a design that can go around corners. These different sensor shapes allow configurability of the sensor module including configurability of FOV, sensor range, etc. Based on the particular configuration of the sensor module and corresponding FOV, different scan patterns and resolutions may be implemented.

MCU 302 may be coupled to an Autonomous Driving System Control Unit (hereinafter, "ADSCU") 301. In certain embodiments, the ADSCU 301 may provide sensor instructions and information to MCU 302.

Figure 3B:
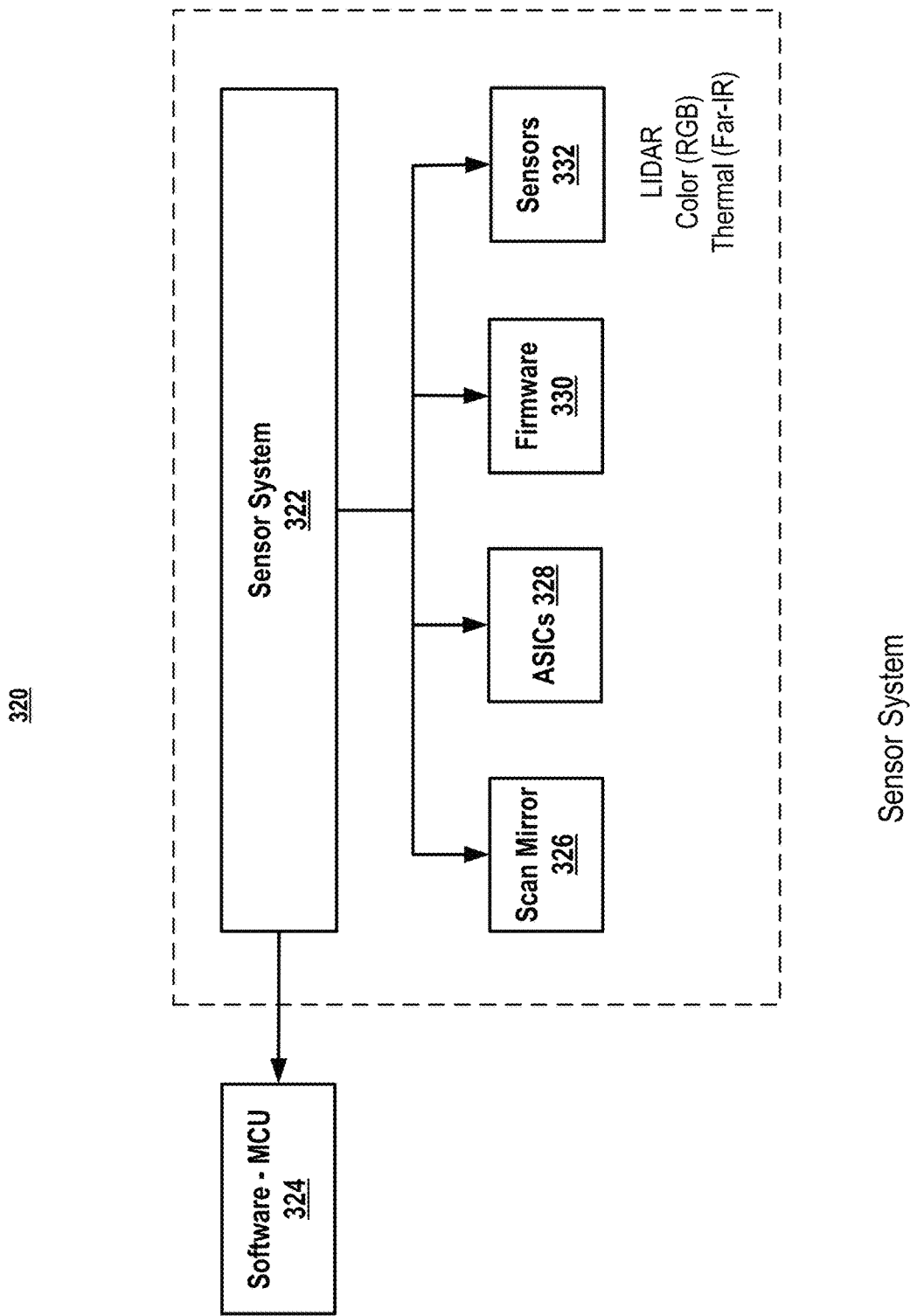
FIG. 3B depicts the framework for a sensor system according to embodiments of the current disclosure.

FIG. 3B depicts the framework for a sensor system 320 according to embodiments of the current disclosure. Sensor system 322 may be supported by MCU 324 and its associated software. Sensor system 322 may include scan mirror 326, ASICs 328, firmware 330 and sensors 332. In some embodiments, scan mirror 326 may be a dual axis resonant scanning mirror. In some embodiments, sensors 332 may support a combination of sensor modules as described above and may include various sensor types including LIDAR, Color (RGB), thermal (Far-IR) or other sensor types known to one of skill in the art. The sensor system 320 is able to receive data signals from a combination of sensor modules, correlate the sensor data and timely process the correlated sensor data in order to make timely decisions based thereon.

In order for autonomous vehicles to perceive their surrounding environment and react accordingly, a plurality of techniques may be applied to the sensor system to collate data from the multiple sensor modules. In particular, it may be necessary to collate the data from the sensor modules for dynamic and spatial analysis/inference, which means their differences are decoupled, and digital information can be transmitted, stored and computed in a way that the vehicles and its operating system efficiently process and act on the different sensor data. In this regard, data from the distributed sensors can be multiplexed to provide a unified data packet and coupled via a sensor bus to a microcontroller.

Figure 3C:
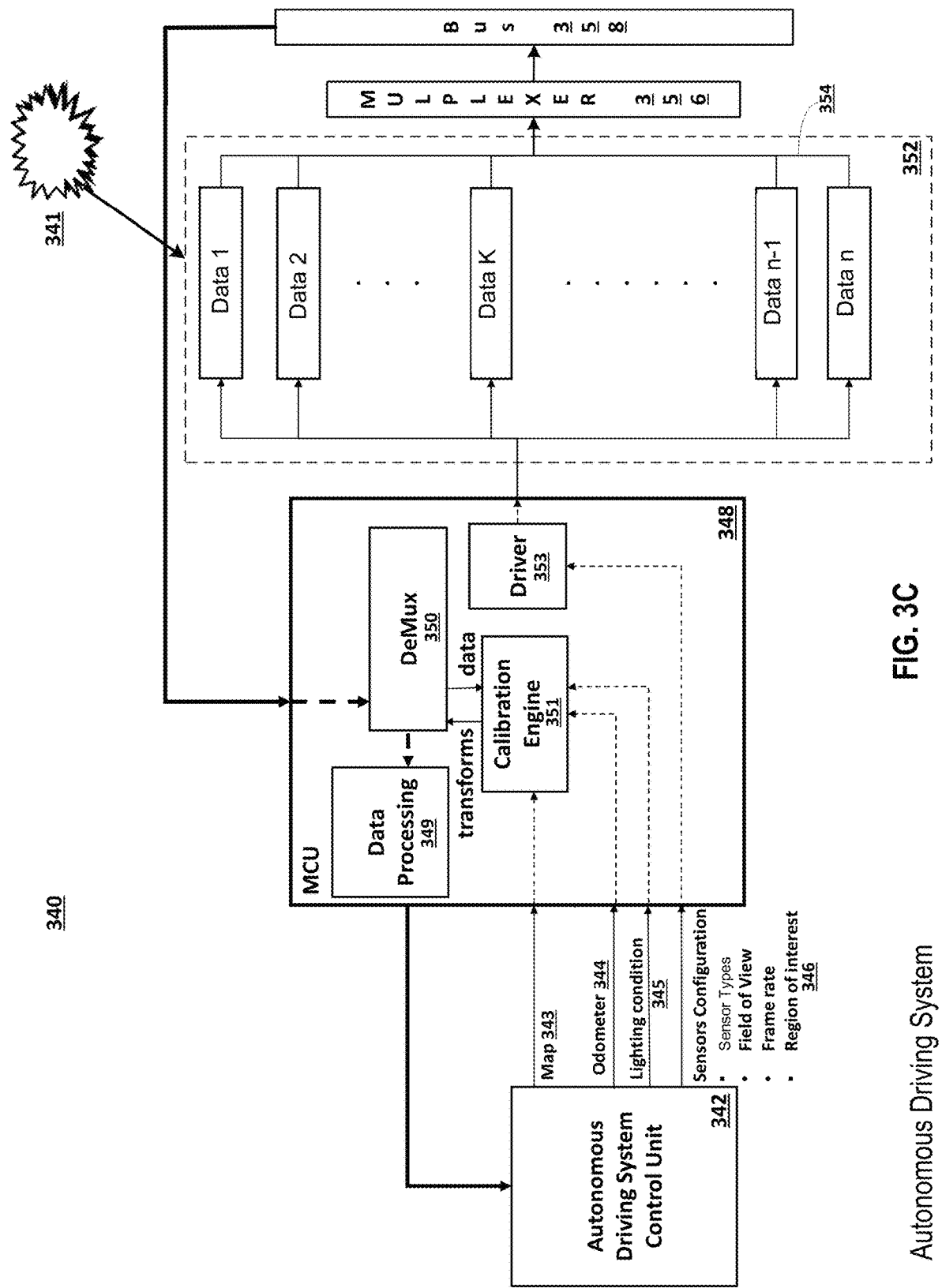
FIG. 3C depicts the operation of an MCU in an autonomous driving system utilizing sensor modules and a sensor bus according to embodiments of the current disclosure.

FIG. 3C depicts the operation of an MCU 348 in an autonomous driving system 340 utilizing sensor module 352 and bus 358 according to embodiments of the disclosure. As illustrated, an object 341 within the autonomous navigation environment is detected by one or more sensor modules 352. As previously described, the structure and type of sensor(s) within the sensor module 352 may vary based on design and/or preference.

The autonomous driving system 340 may support multiple configurations and redundancies based on the number, types and locations of sensor modules 352 installed around the vehicle. Sensor modules 352 may be activated based on the application and external conditions. For example, when an automobile is being driven on an open highway a fewer number of sensors and/or sensor modules may be activated relative to when an automobile is being driven within heavy traffic. Additionally, sensors and/or sensor modules may be activated based on a particular mode in which an automobile is operating. For example, particular sensors may be activated if a vehicle is operating is a pilot mode as compared to an autonomous mode. This dynamic activation of sensors is another aspect of the configurability of the sensor network, which allows the system to be dynamically adapted to its environment both at installation as well as during operation.

Sensor module(s) 352 may detect an object 341 across a plurality of sensors and separately couple their detected data signals (shown as data streams 1 thru n) 354 to multiplexer 356. Multiplexer 356 combines the channels of different sensed data and generates a unified data packet correlating the data from each of the sensors. In some embodiments, the unified data packet comprises range and reflectivity data from LIDAR transceiver, color/RGB data from a camera, temperature data from a far infrared detector. In other embodiments, other sensor types from other region of electromagnetic spectrum such as acoustics, radar or sonar may be included. One skilled in the art will recognize that the sensor module 352 may include various combinations of sensor module(s), sensor types and sensor configurations. The unified data packet is coupled to a bus 358, which is typically serial but may also be parallel in nature.

The data from the multiple sensors and/or sensor modules may be multiplexed and coupled via bus 358 to a microcontroller MCU 348. MCU 348 interacts with an autonomous driving system control unit (hereinafter, "ADSCU") 342 to receive the configuration and parameters for data acquisition from sensors.

In certain embodiments, the MCU 348 may receive external conditions and information about the motion of the car. MCU 348 comprises data processing element 349, demultiplexer 350, calibration engine 351 and driver 353. In certain embodiments where the bus is serial, the de-multiplexer 350 receives the data serially from multiple sensor modules and uses the calibration parameter from the calibration engine to transform the data as if it is coming from a sensor (i.e., on a sensor channel basis). Calibration engine 351 provides the transforms between different sensors and/or sensor modules. In certain examples, these transforms are initialized to factory settings and constantly updated over time. The data processing element 349 comprises single or multiple embedded algorithms for computing information such as object detection, velocity estimation, localization to roads and external maps. Driver 353 is responsible for activating the sensors and/or sensor modules of interest, and also providing the clock triggers.

The demultiplexer 350 de-multiplexes the unified serial data packet of sensor data and associates the data with a corresponding sensor and/or sensor module. Thereafter, this data is provided to the calibration engine 351, which generates transform information based on calibration parameters received from ADSCU 342. The demultiplexer 350 also receives the spatial transform information and integrates it with the de-multiplexed unified serial data packet of sensor data into a particular format such as a point cloud format.

As previously noted in FIG. 3A, the ADSCU 342 may provide sensor instructions to MCU 302. In certain embodiments, ADSCU 342 is the computer in the automobile and is an element manufactured into the vehicle. As shown in FIG. 3C, ADSCU 342 receives an input in the form of a point cloud from data processing 349, a component of MCU 348. In certain embodiments, the odometer, lighting conditions and external map may be provided to the MCU 348 from another device within the vehicle. ADSCU 342 may also generate sensor configurations 346 including sensor type configurations, field of view, frame rate and region of interest. The region of interest may be, for example, a pedestrian crosswalk or a driving lane. Via a region of interest identification method, the autonomous driving system 340 can filter out amounts of unwanted raw data for the actual tracking. Effectively, MCU 348 homogenizes and decouples the different types of sensor data. With dynamic feedback from the ADSCU 342 in the form of calibration parameters and sensor configuration, MCU 348 can dynamically configure sensors and/or sensor modules across different configurations and space in an autonomous automobile environment.

FIGS. 3D and 3E illustrate methods 360 and 361 for dynamically configuring multi-sensor modules across different types of sensors and space according to embodiments of the current disclosure comprises the following steps:

Receive at MCU (Driver) sensor configuration parameters and receive at MCU (calibration engine) calibration parameters from ADSCU (step 362)

Send from MCU (Driver) configuration parameters to activate selective single sensor module or multi-sensor modules (step 364)

Acquire data from an object within the environment by the selected sensor module(s) (step 366)

Multiplex the sensor data to generate a unified data packet (step 368)

Send the unified data packet via a bus to MCU (step 370)

In the MCU, de-multiplex unified data packet into homogeneous sensor data (step 372)

In the MCU, send the homogeneous sensor data to a calibration engine (step 374)

In the MCU, generate transform information in the calibration engine and send transform information to de-multiplexer (step 376)

In the MCU, integrate, by the de-multiplexer, the homogeneous sensor data and the transform data, and send to data processing (step 378)

Generate by data processing of the MCU, a point cloud comprising the homogeneous sensor data and the transform data and send to ADSCU (step 380)

In the ADSCU, determine/adjust control of the vehicle based on the point cloud and generate updated sensor configurations and calibration parameters (step 382)

Repeat step 362

Figure 3F:
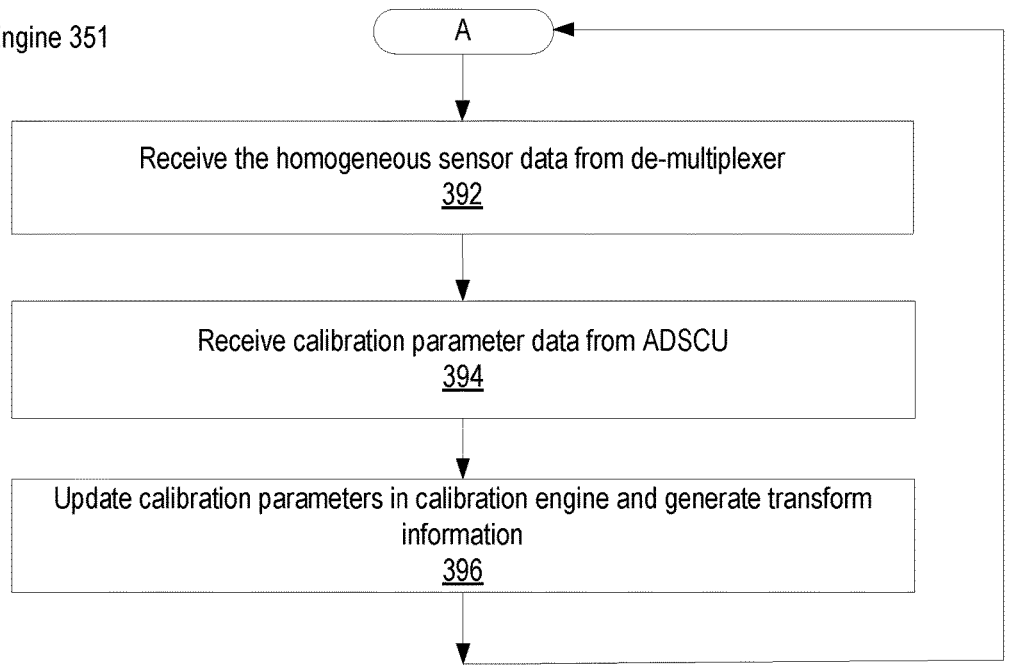
FIG. 3F illustrates a method for updating calibration parameters in a calibration engine according to embodiments of the current disclosure.

FIG. 3F illustrates a method 390 for updating calibration parameters in a calibration engine according to embodiments of the current disclosure comprises the following steps:

Receive the homogeneous sensor data from de-multiplexer (step 392)

Receive calibration parameter data from ADSCU (step 394)

Update calibration parameters in calibration engine and generate transform information (step 396)

The above description illustrates the configurability of autonomous navigation at a system level including the activation of certain sensors and/or sensor modules as well as the correlation of data across these sensors and sensor modules. In another aspect of the invention, each sensor module may be configured to operate in accordance with a preferred set of parameters.

Figure 4A:
FIG. 4A and FIG. 4B depicts configurable sensor architectures according to embodiments of the current disclosure.
Figure 4B:
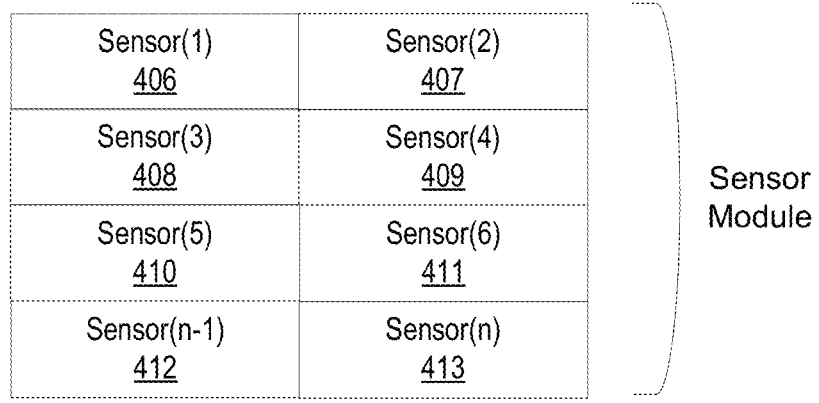

FIG. 4A depicts sensor module 400 and FIG. 4B depicts sensor module 402 from which configurable operational parameters may be defined. This configurability not only allows for FOV definition but also sensor type configuration within a sensor module. Additionally, this configurability may be implemented at installation or in real-time during operation of the system. According to various embodiments, the sensor modules may be configured by defining directionality of one or more sensors within the sensor module using the physical structure of the sensor or by the inclusion of directionality elements (e.g., wedges) that define a direction of a corresponding sensor. As shown in FIG. 4B, sensor module 402 may comprise a plurality of sensors 406-413 that are coupled together in particular architecture such that a combination of individual sensor FOVs is stitched together to create a broader FOV of the sensor module. This configurability of sensor modules allows a user to effectively build unique sensor modules by combining the different sensors into diverse architectures. The configurability is further enhanced by the ability to include different sensor types within the sensor module to enhance performance relative to environmental characteristics in which the module operates.

A sensor module 402 has a horizontal FOV and vertical FOV that corresponds to the combination of sensors 406-413. The operational characteristics of each sensor 406-413 within the module 402 are combined to provide an enhanced modular FOV. These operational characteristics include the directionality of a sensor, the range of a sensor, the FOV of a sensor, the type of a sensor and other characteristics known to one of skill in the art. In certain embodiments, particular sensors within a module may be activated or deactivated depending on the environment in which the system is operating. In addition, particular sensors may function as redundant elements in case one or more of the sensors fails or becomes temporarily inoperable. The FOV of the sensor module not only depends on the specific operational characteristics of each sensor but also on the manner in which data from these sensors is correlated and combined.

FIG. 4C illustrates a specific example Lissajous scan pattern and resolution 432 based on different vertical FOVs of a sensor according to embodiments of the present disclosure. Scan 432 illustrates a vertical scan and a horizontal scan resulting from different vertical FOV configurations of a sensor.

The diagrams on the right side of FIG. 4C illustrate the scan resolutions for different FOVs. FIG. 4D, vFOV 434 illustrates the scan resolution with a 2.5 degree FOV. FIG. 4E, vFOV 436 illustrates the scan resolution with a 5 degree FOV. FIG. 4F, vFOV 438 illustrates the scan resolution with a 10 degree FOV. The resolution achieved with a 2.5 degree FOV is twice as dense as the resolution achieved with a 5 degree FOV. Similarly, the resolution achieved with a 5 degree FOV is twice as dense as the resolution achieved with a 10 degree FOV. This example illustrates the configurability of a sensor and its resultant affect on scan pattern and resolution. One skilled in the art will recognize that numerous patterns and resolutions may be achieved by configuring a sensor in accordance with aspects of the present disclosure.

Figure 4G:
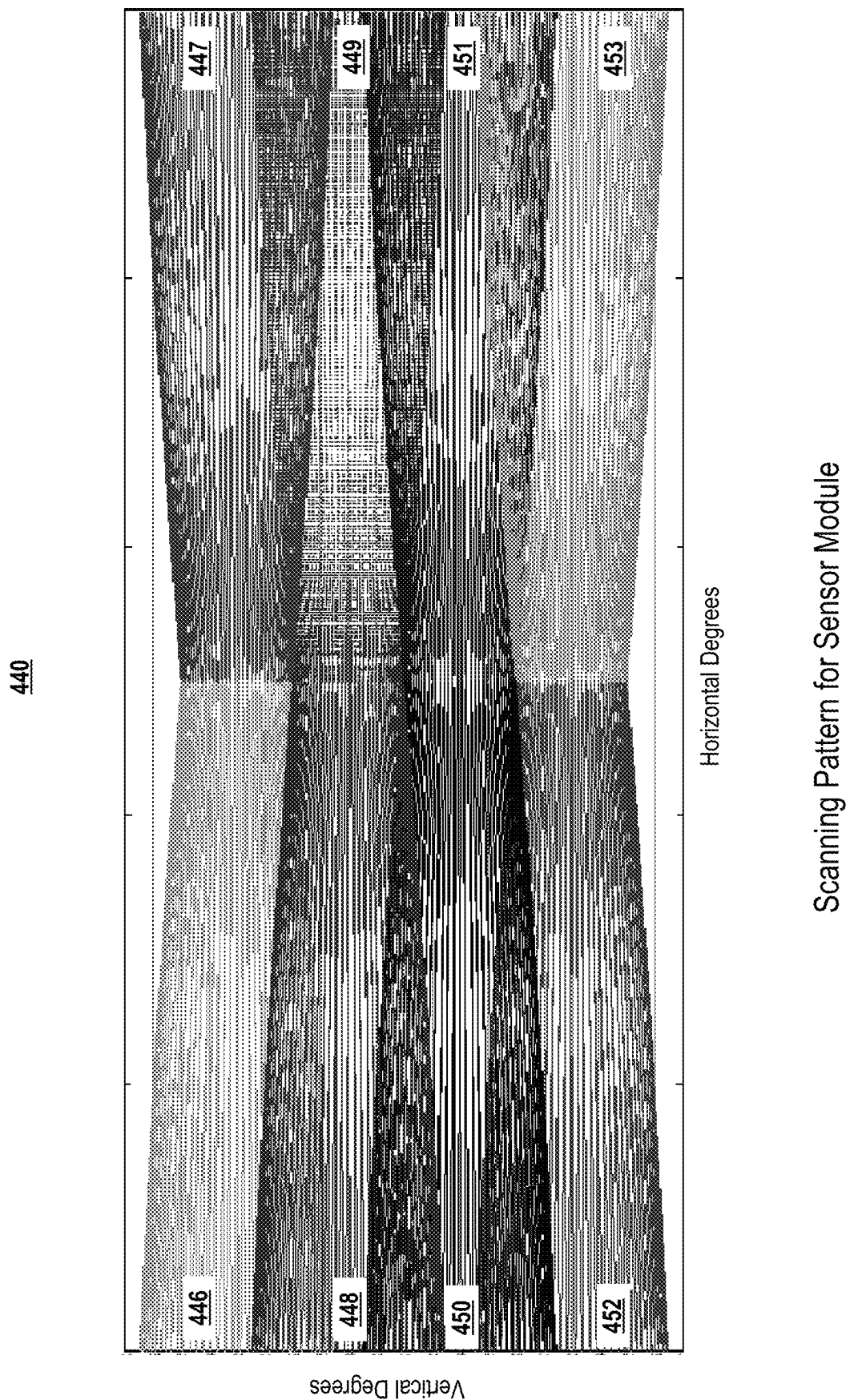
FIG. 4G illustrates a specific scanning pattern for a sensor module comprising eight sensors according to embodiments of the present disclosure.

The configurability of a sensor module is further enhanced not only by the specific operational parameters of one or more sensors therein, but the manner in which the one or more sensors is combined within the module. FIG. 4G illustrates an exemplary scanning pattern 440 for a sensor system comprising eight sensors within a sensor module according to embodiments of the present disclosure. Scanning pattern 440 may be obtained using sensor module architecture 402 in which data sensed across the eight sensors is combined to provide enhanced resolution and field of view. Scanning pattern 440 comprises scan 446, scan 447, scan 448, scan 449, scan 450, scan 451, scan 452, and scan 453 that are correlated and processed to generate the pattern. In this example, the total field of view for sensor module architecture 402 is approximately 40 degrees by 120 degrees. One skilled in the art will recognize that a diverse of modular FOVs and other module performance characteristics may be achieved by modifying the way in which sensors are coupled together, the specific parameters of the sensors and the methods in which the sensor data is correlated and analyzed.

Figure 4I:
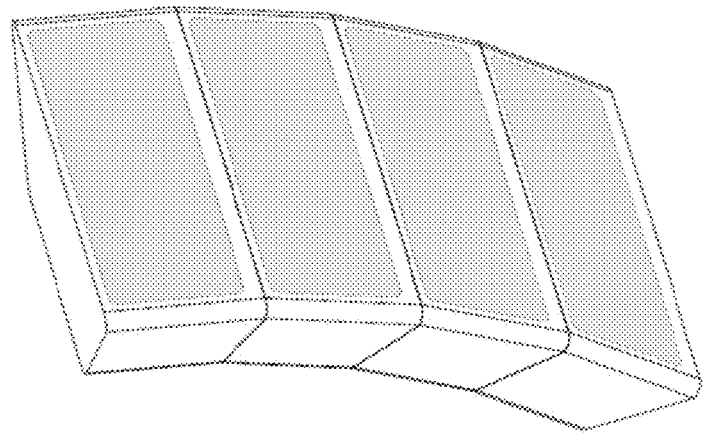
FIG. 4H and FIG. 4I illustrates exemplary sensor square and pie wedge configurations according to embodiments of the present disclosure.
Figure 4H:
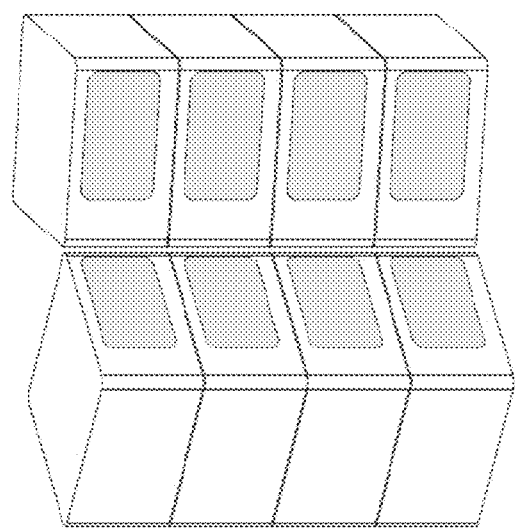

FIG. 4H and FIG. 4I illustrates sensor module configurations 461 and 462, respectively, according to various embodiments of the invention. These configurations are intended to be exemplary and not limiting to the scope of the invention. In one embodiment, a sensor module configuration may be a square or rectangle shape, as illustrated in configuration 461, in which individual sensor shapes are configured to provide particular operational characteristics within the module. Configuration 461 comprises two stacked sets of sensors in which physical structures define a FOV for each sensor. For example, physical size and directionality of a sensor may provide different angular and spatial scanning characteristics that are used within the sensor module. As a result, sensor shape and relative locations of the sensors provide a particular scan resolution and FOV. In another configuration, a sensor module configuration may be a wedge shape, as illustrated in configuration 462, in which physical wedge elements define the directionality of sensors within the module. These two examples illustrate to one of skill in the art the vast number of configurable combinations of sensors within a sensor module. In one example, the sensors are LiDAR sensors with corresponding operational characteristics that allow an MCU to build an enhanced scan pattern with preferred resolution. The performance of the sensor system may be further enhanced in some embodiments by the inclusion of different sensor types within a sensor module.

LIDAR sensors provide unique capabilities for autonomous driving based primarily on the rate and accuracy at which these sensors operate. These LiDAR sensors create an accurate map that can be quickly and unambiguously processed to make rapid navigation decisions with minimal error. However, certain embodiments of the present invention support non-LiDAR sensors that may be included within a sensor module to supplement the LiDAR sensor data. This multi-sensor module employing different types of sensors present unique challenges in the correlation of sensed data across these sensors. Different types of sensors may have different rates of data collection resulting in a more difficult correlation across time. Additionally, different sensors that are closely collocated within the module may be subject to parallax error because data are taken from different vantage points. Accordingly, the use of different types of sensors within a single sensor module further complicates the correlation problem previously described as well as introduces additional complexities within the data analysis and response processing of the system.

Various embodiments of the invention provide a more efficient manner for sensor data correlation across diverse types of sensors by physically combining the different sensors within a single module package. This multi-sensor module employing different sensors insures that there is a 1:1 correspondence between data points from the various sensors. The sensor data stream can be presented to the autonomous systems with the various sensor-type data, already combined into a correlated data packet. The autonomous system bandwidth can then be focused on the task of navigation rather than preprocessing and correlation of the mixed data sets.

In one embodiment, consider a LIDAR system that returns a single point from the environment. This single data point is already both a distance measurement (range) as well as an object reflectivity measurement with active illumination. As a further enhancement, the LIDAR detector can also passively measure ambient light from the scene to effectively render a passive grayscale value associated with each LIDAR channel. In a real-world navigation scenario, the color of an object carries important information about its relevance. For example, stop signs and stoplights are red, yellow means caution, green may mean "information" or safe to go and so forth. Providing a unified data packet in which a data point has distance, reflectivity and color provides the autonomous system additional immediate information on the relevance of an object in the field of view Another key aspect of the real world is that it is full of living creatures. There are generalized algorithms that attempt to classify detected objects based on size, shape and velocity. However, faults in such algorithms have been demonstrated and may result in errors within the sensor system. One key feature of most living animal creatures that an autonomous system may encounter is that they are warm blooded and generally have a different temperature than their surrounding environment. This characteristic can make it possible to monitor the temperature of objects with various thermal detection technologies. With a thermal sensor incorporated into the LIDAR sensor, yet another data type can be incorporated into the single data packet for each data point reported by the sensor, namely the temperature of the associate object. The ability to instantly classifies the object as a living creature has obvious benefits to rapid autonomous system decision making. The fact that the data are naturally correlated to a real physical object greatly improves both reaction time and certainty of object identification. In certain embodiments, correlation of diverse sensor data may be used to derive a confidence factor of an identified object so that a processed response may take into account the likelihood of an object being one type of object versus another type.

Thermal sensors provide real-time 3D thermo-spatial information, allowing for more intelligent machine vision. For example, but without limitation, an array of photodetectors sensitive to long IR electromagnetic radiation serving alongside a scanning LIDAR system can simultaneously localize objects in a 3D environment and discriminate warm objects (such as living beings) from other objects in a conventional automotive environment. Active-tracking system can deliver real-time digital information (as opposed to a passive tracking system that delivers a trigger signal) regarding the location and temperature of warm objects to a vehicle control system. A single detector can provide data over a large area by implementing a fast scanning mechanism. A large and dense array of channels can provide thermo-spatial data of in all directions and with high resolution. Furthermore, detectors can be arranged so that the data is both temporally and spatially correlated with the LiDAR channels.

One skilled in the art will recognize that numerous combinations of sensor types may be included within a sensor module and used to improve the performance of the sensor system. In certain examples, these different sensor types may be used to enhance the performance of a LiDAR system and provide greater accuracy based on certain correlated aspects of sensed data relative to LiDAR data.

Figure 4J:
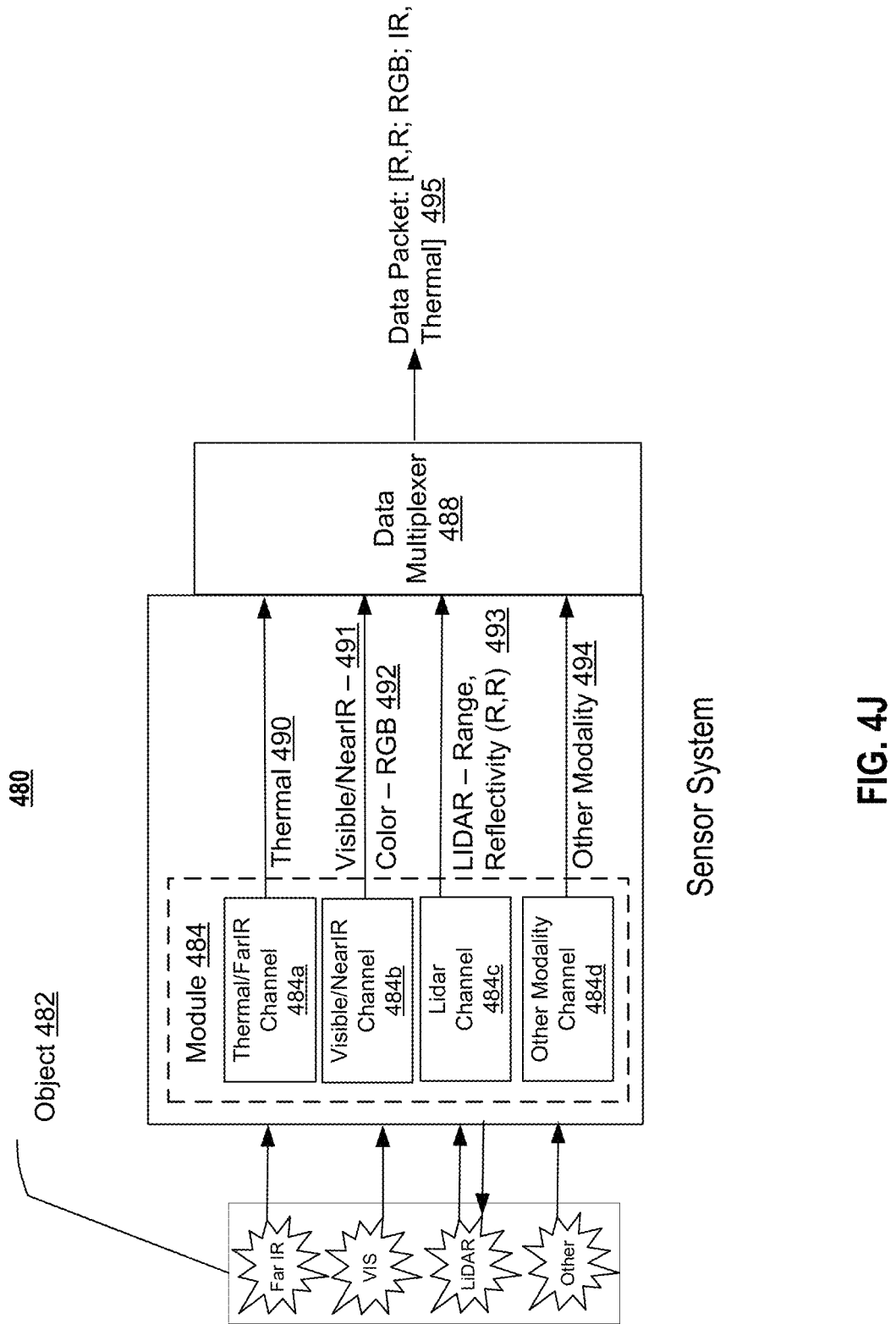
FIG. 4J illustrates a sensor system that supports detection of objects with various sensor types including LIDAR, infrared radiation (IR), ambient light modalities to detect range, reflectivity, temperature and color respectively according to embodiments of the present disclosure.

FIG. 4J illustrates a sensor system 480 that supports detection of an object 482 using different types of sensors within a sensor module 484 according to various embodiments of the invention. In this example, a sensor module 484 may comprise various combinations of a LiDAR sensor, thermal/far infrared radiation (IR) sensor, visible/near IR sensor as well as other sensor types known to one of skill in the art. The sensor module 484 receives signals from different sensor types relative to a sensed object 482. The sensor data from each different type of sensor is captured and provided to a multiplexer 488 along corresponding channels 490-494. This data may be subsequently represented on a single cloud point for further processing.

In a specific example, sensor 484*a* (Thermal/FarIR Channel) may comprise an array of photodetectors sensitive to long IR electromagnetic radiation. Sensor 484*a* can simultaneously localize objects in a 3D environment and discriminate warm objects (such as living beings) from other objects in a conventional automotive environment. Sensor 484*b* (Visible/NearIR Channel) detects RGB color characteristics of ambient light and may also include sensors to detect other light sources such as near infrared light. Sensor 484*d* may also include a sensor for another region of electromagnetic spectrum such as acoustics, radar or sonar. These sensors 484*a*, 484*b* and 484*d* are used to supplement the LiDAR sensor 484*c* to provide an enhanced sensor system performance.

Data multiplexer 488 generates a unified data packet 495 representing the correlated data from the different sensors 484*a-d* in a unified data packet. The data is correlated in that they are acquired from the same point in space (or nearly the same point and unified in that they are bundled into a single data packet).

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 5:
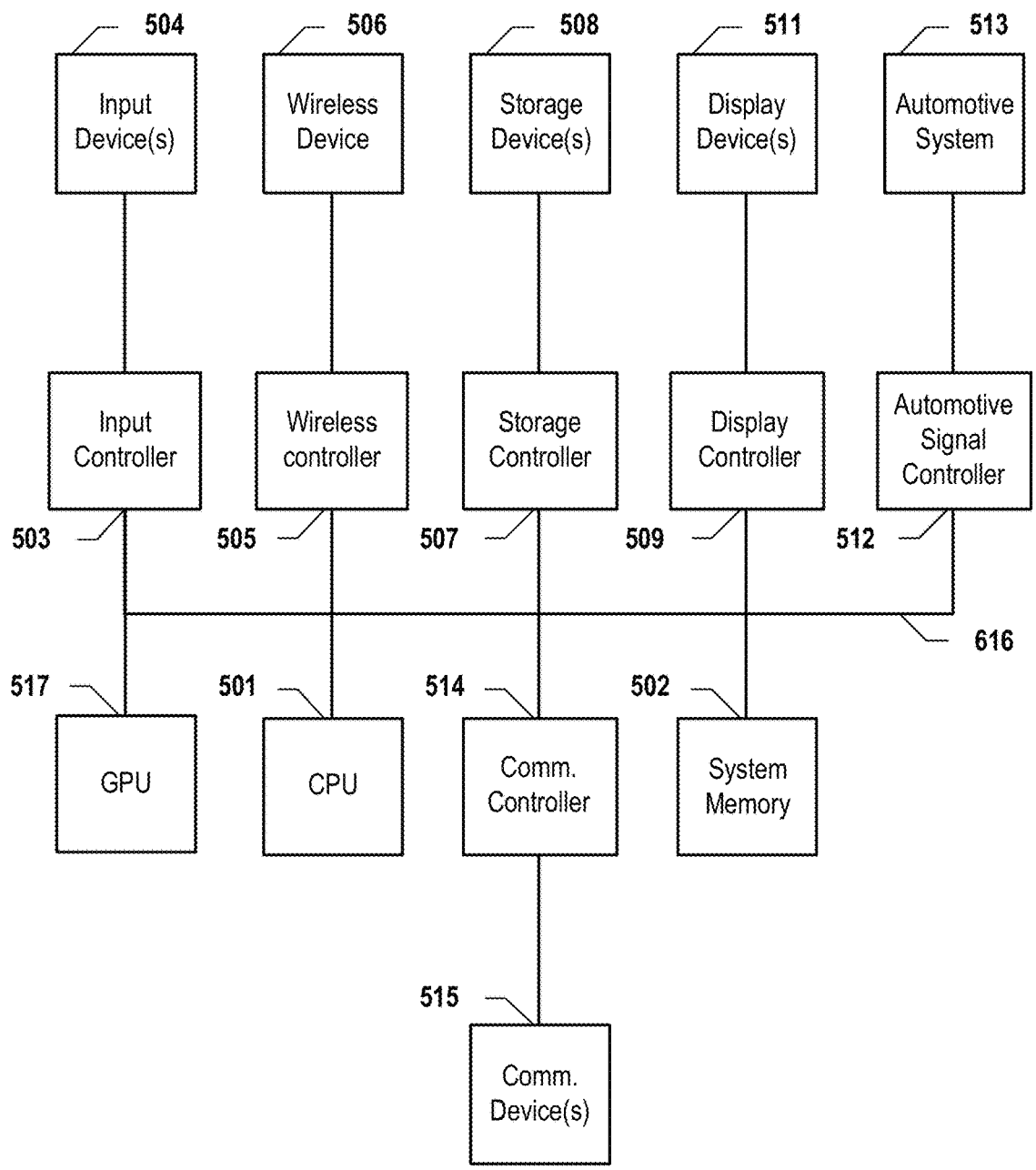
FIG. 5 depicts a simplified block diagram of a computing device/information handling system for an automotive application, in accordance with embodiments of the present document.

FIG. 5 depicts a simplified block diagram of a computing device/information handling system (or computing system) according to embodiments of the present disclosure. It will be understood that the functionalities shown for system 500 may operate to support various embodiments of an information handling system—although it shall be understood that an information handling system may be differently configured and include different components.

As illustrated in FIG. 5, system 500 includes one or more central processing units (CPU) 501 that provides computing resources and controls the computer. CPU 501 may be implemented with a microprocessor or the like and may also include one or more graphics processing units (GPU) 517 and/or a floating point coprocessor for mathematical computations. System 500 may also include a system memory 502, which may be in the form of random-access memory (RAM), read-only memory (ROM), or both.

A number of controllers and peripheral devices may also be provided, as shown in FIG. 5. An input controller 503 represents an interface to various input device(s) 504, such as a keyboard, mouse, or stylus. There may also be a wireless controller 505, which communicates with a wireless device 506. System 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present invention. Storage device(s) 508 may also be used to store processed data or data to be processed in accordance with the invention. System 500 may also include a display controller 509 for providing an interface to a display device 511, which may be a cathode ray tube (CRT), a thin film transistor (TFT) display, or other type of display. The computing system 500 may also include an automotive signal controller 512 for communicating with an automotive system 513. A communications controller 514 may interface with one or more communication devices 515, which enables system 500 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A controller for use within a sensor system, the controller programmed to perform operations comprising:
   receiving sensor data from a plurality of sensor modules;
   providing transform data indicating a plurality of transforms between a plurality of sensors within the plurality of sensor modules;
   demultiplexing a serial stream of sensor data from the plurality of sensor modules based on homogenizing and decoupling a plurality of different types of sensor data from the serial stream of sensor data using the transform data;
   and
   processing the demultiplexed sensor data to generate a response.

2. The controller of claim 1, wherein the operations the further comprise activating at least one of the sensors within the plurality of sensors.

3. The controller of claim 1, wherein the operations further comprise receiving external condition data.

4. The controller of claim 3 wherein the external condition data comprise at least one of an odometer reading, a lighting condition, a vehicle speed reading, an external map, or a congestion indicator.

5. The controller of claim 3 wherein the operations further comprise receiving sensor configuration data related to at least one of the sensor modules within the plurality of sensor modules.

6. The controller of claim 5 wherein the sensor configuration data comprise at least one of a sensor type, a field of view, a frame rate, or a region of interest associated with at least one sensor module in the plurality of sensor modules.

7. The controller of claim 6 wherein the operations further comprise updating calibration data based on the external condition data and the sensor configuration data.

8. The controller of claim 1 wherein the received sensor data are correlated across a subset of sensors within the plurality of sensors.

9. The controller of claim 8 wherein the subset of sensors within the plurality of sensors comprises at least two different types of sensors.

10. The controller of claim 1 wherein the plurality of sensors comprises at least one LiDAR sensor.

11. The controller of claim 10 wherein the plurality of sensors comprises at least one thermal sensor.

12. The controller of claim 10 wherein the plurality of sensors comprises at least one color sensor.

13. The controller of claim 1, wherein the controller is coupled to an autonomous driving system control unit operable to monitor a plurality of external conditions relevant to autonomous driving of a vehicle.

14. The controller of claim 1, wherein processing the demultiplexed sensor data to generate the response comprises integrating the demultiplexed sensor data with spatial transformation data to generate a point cloud.

15. A method comprising:
receiving, at a controller, sensor data from a plurality of sensor modules;
providing, by the controller, transform data indicating a plurality of transforms between a plurality of sensors within the plurality of sensor modules;
demultiplexing, by the controller, a serial stream of sensor data from the plurality of sensor modules based on homogenizing and decoupling a plurality of different types of sensor data from the serial stream of sensor data using the transform data; and
processing, by the controller, the demultiplexed sensor data to generate a response.

16. The method of claim 15 further comprising activating at least one of the sensors within the plurality of sensors.

17. The method of claim 15 further comprising providing external condition data to the controller.

18. The method of claim 17 wherein the external condition information comprises at least one of an odometer reading, a lighting condition, a vehicle speed reading, an external map, or a congestion indicator.

19. The method of claim 17 further comprising receiving sensor configuration data related to at least one of the sensor modules within the plurality of sensor modules.

20. The method of claim 19 wherein the sensor configuration data comprise at least one of a sensor type, a field of view, a frame rate, or a region of interest associated with at least one sensor module in the plurality of sensor modules.

* * * * *